(12) United States Patent
Søraker et al.

(10) Patent No.: US 8,863,572 B2
(45) Date of Patent: Oct. 21, 2014

(54) METHOD AND SYSTEM FOR THE PROTECTION OF INTERNAL FILTERS OF A LTFT SLURRY BUBBLE REACTOR

(75) Inventors: Pål Søraker, Trondheim (NO); Marcus Fathi, Trondheim (NO); Alton Christo Liedeman, Mossel Bay (ZA); Jan Jacobus Van Aswegan, Mossel Bay (ZA); Rodney Bruce Buchan, Mossel Bay (ZA)

(73) Assignees: The Pretroleum Oil and Gas Corporation of South Africa (Pty) Ltd., Parow (ZA); StatoilHydro ASA, Stavanger (NO)

( * ) Notice: Subject to any disclaimer, the term of this patent is extended or adjusted under 35 U.S.C. 154(b) by 1175 days.

(21) Appl. No.: 12/522,905

(22) PCT Filed: Jan. 9, 2008

(86) PCT No.: PCT/ZA2008/000002
§ 371 (c)(1),
(2), (4) Date: Dec. 8, 2009

(87) PCT Pub. No.: WO2008/086543
PCT Pub. Date: Jul. 17, 2008

(65) Prior Publication Data
US 2010/0089148 A1    Apr. 15, 2010

(30) Foreign Application Priority Data
Jan. 11, 2007    (ZA) .................................. 2007/00303

(51) Int. Cl.
*G01F 23/00*    (2006.01)
*G01F 23/76*    (2006.01)
*B01J 8/22*    (2006.01)
*B01J 8/00*    (2006.01)
*G01F 23/288*    (2006.01)
*B01J 8/20*    (2006.01)
*G01F 23/284*    (2006.01)
*G01F 23/68*    (2006.01)
*G01F 23/292*    (2006.01)

(52) U.S. Cl.
CPC .......... *B01J 8/20* (2013.01); *B01J 2219/00202* (2013.01); *G01F 23/76* (2013.01); *B01J 8/22* (2013.01); *B01J 8/006* (2013.01); *B01J 2219/00268* (2013.01); *G01F 23/288* (2013.01); *B01J 2219/00211* (2013.01); *G01F 23/284* (2013.01); *B01J 2219/00225* (2013.01); *B01J 2219/0024* (2013.01); *G01F 23/683* (2013.01); *B01J 2208/0061* (2013.01); *G01F 23/00* (2013.01); *G01F 23/2921* (2013.01)
USPC ...................................................... 73/290 R

(58) Field of Classification Search
CPC ... G01F 23/00; G01F 23/284; G01F 23/0076; G01F 23/2921
USPC ................... 518/700, 726; 73/290 R
See application file for complete search history.

(56) References Cited

U.S. PATENT DOCUMENTS 4,639,227 A * 1/1987 Rademakers ...................... 441/1
5,184,510 A    2/1993 Rossman ..................... 73/290 V
(Continued)

FOREIGN PATENT DOCUMENTS

EP    0 298 529 A    1/1989
EP    0 770 886 A    5/1997

*Primary Examiner* — Hezron E Williams
*Assistant Examiner* — Rodney T Frank
(74) *Attorney, Agent, or Firm* — Knobbe Martens Olson & Bear, LLP.

(57) ABSTRACT

The invention provides a method for the protection of internal filters of a LTFT slurry bubble reactor. The method includes the step of activating an emergency back-flush procedure during low slurry level conditions and/or during increasing temperature of an internal filter.

13 Claims, 1 Drawing Sheet

(56) References Cited

U.S. PATENT DOCUMENTS

Figure 1:
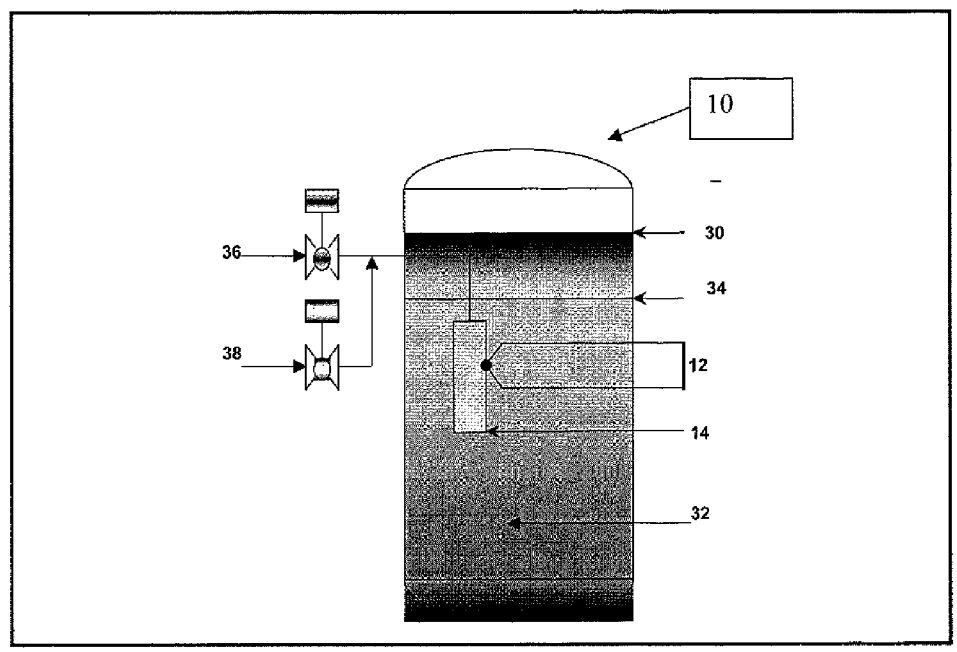

| | | | |
|---|---|---|---|
| 5,408,874 A | 4/1995 | Fleck, Sr. et al. | 73/290 V |
| 5,500,449 A | 3/1996 | Benham et al. | 518/700 |
| 5,527,473 A | 6/1996 | Ackerman | 210/767 |
| 5,844,006 A * | 12/1998 | Jager et al. | 518/700 |
| 5,939,350 A | 8/1999 | Singleton et al. | 502/230 |
| 6,932,951 B1 * | 8/2005 | Losey et al. | 422/211 |
| 7,421,895 B1 * | 9/2008 | Caldwell | 73/290 V |
| 2003/0129110 A1 * | 7/2003 | Steynberg | 422/245.1 |
| 2005/0264441 A1 | 12/2005 | Abrahamsson | 342/124 |
| 2008/0150789 A1 * | 6/2008 | Jirskog et al. | 342/124 |
| 2009/0261046 A1 * | 10/2009 | Minnie et al. | 210/798 |
| 2010/0216896 A1 * | 8/2010 | Wang et al. | 518/700 |

* cited by examiner

METHOD AND SYSTEM FOR THE PROTECTION OF INTERNAL FILTERS OF A LTFT SLURRY BUBBLE REACTOR

CROSS REFERENCE TO RELATED APPLICATIONS

This application is the national phase under 35 U.S.C. §371 of PCT International Application No. PCT/ZA2008/000002 which has an International filing date of Jan. 9, 2008, designating the United States of America, which claims the benefit of South Africa Application Number 2007/00303 filed on Jan. 11, 2007, the disclosures of which are hereby expressly incorporated by reference in their entirety and are hereby expressly made a portion of this application.

FIELD OF THE TECHNOLOGY

This invention relates to the protection of internal filters of a LTFT slurry bubble reactor from damage caused by localised increased heat excursions. More particularly, the invention relates to a method for the protection of internal filters of a LTFT slurry bubble reactor, a method measuring and monitoring the slurry level in a LTFT reactor and a device and system for measuring and/or monitoring the slurry level in a LTFT reactor.

BACKGROUND OF THE INVENTION

The Low Temperature Fischer-Tropsch process for production of wax from synthesis gas using a solid catalyst involves the filtration of wax from a slurry. During normal filtration, the filters are submerged in the slurry and a filter cake of catalyst builds on the filter. The filter cake is normally required for effective filtration. In case of low-level slurry conditions in the filter area of the reactor, the filters together with the filter cake could be exposed to a synthesis gas atmosphere in the head of the reactor. Localised temperature excursions can occur due to the high heat of reaction and low heat removal during conversion of the synthesis gas in a synthesis gas atmosphere. It is an object of the invention to prevent heat excursions which may cause permanent damage to the filters.

In the LTFT reactor the slurry is formed by keeping the solid catalyst in suspension in a hydrocarbon liquid by synthesis gas rising from the bottom of the reactor. Synthesis gas is converted to hydrocarbons. The slurry is a dynamic medium in continuous flux regarding parameters such as, slurry level, density, temperature, catalyst concentration, pressure, gas feed etc. As a result it is a challenge to monitor the slurry level.

One known method of measuring the level of the slurry in the reactor involves the measurement of the density of the slurry, using pressure sensors and transmitters. To measure the level in the reactor using the above density dependence method, is a challenge in environment of continuous formation of products and which is continuously changing density by as much as between 690 kg/m$^3$ to 350 kg/m$^3$.

A second known method of measuring the level of the slurry in the reactor involves using radar reflection of the surface of the slurry. However due to the gas rising through the slurry bed, the dielectric constant of the slurry surface becomes low and the radar beam is largely absorbed by the slurry and results in a weak and unreliable reflected beam.

A third known method uses nuclear sensors and transmitters. The sensor uses a radiation source and detector and is custom designed for the application taking into account the product properties, reactor material and thickness as well as insulation material and thickness.

It is a further object of this invention to provide a reliable method to measure the slurry level in a LTFT reactor.

SUMMARY OF THE INVENTION

According to a first aspect of the invention, there is provided a method for the protection of internal filters of a LIFT slurry bubble reactor, which method includes the step of:

activating an emergency back-flush procedure during low slurry level conditions and/or during increasing temperature of an internal filter.

The method may include the step of monitoring the slurry level in the LTFT reactor and/or the step of monitoring the temperature of the filters.

It will be appreciated that the emergency back-flush step removes the filter cake of catalyst from the filter to prevent exposure of the filter cake to a synthesis gas atmosphere; thereby preventing localised temperature excursions, which may damage the filters.

It will further be appreciated that either of, or both, the slurry level and temperature may be monitored to activate the emergency back-flush system and that above a certain temperature may indicate low slurry levels or a heat increasing condition. It is preferable to monitor the slurry level so that exposure of the filters and filter cake to a synthesis gas atmosphere is prevented.

The temperature may be monitored by thermo couples arranged inside hollow filters.

The emergency back-flushing step may be triggered before the filters are exposed to the synthesis gas atmosphere in the head of the reactor.

The emergency back-flushing procedure may include a short burst of 1 to 10 seconds of liquid back flush followed by a gas back-flush. The procedure may preferably be repeated 3 times.

The slurry level may be monitored by one or more of electromagnetic wave signals such as radar-, or differential pressure or nuclear sensors, preferably by means of a radar transmitter or transceiver installed at the top of the reactor measuring down a stilling well.

The temperature along the filters are monitored and recorded. After an emergency back-flush the recorded temperatures can be consulted to see if any possible permanent damage has occurred to any one of the filters.

It will be appreciated that the recorded temperature measurement may provide information related to the maximum temperature that the filters and the filter cake were exposed to during normal and low level conditions. From this information more accurate and informed deductions can be made related to the condition of the filters and whether or not any of the filters need to be replaced or repaired.

The slurry level may preferably be monitored by a radar transmitter installed at the top of the reactor measuring distance down a stilling well. The distance measured may be to a low-density float floating on the slurry in the still well. The float may be manufactured from lightweight titanium metal.

Flat disks may be fixed to the top and/or bottom of the float. It will be appreciated that the purpose of the top disk is to provide a reflective surface with a high dielectric constant. It will further be appreciated that he purpose of the bottom disk is to stabilize the float position in the stilling well.

The density of the float should be less than 300 kg/m$^3$.

One advantage of the present invention is that due to the low density of the float, it always floats on top of the slurry despite density changes. A further advantage of this invention is that the flat disk with a high dielectric constant, installed on the top of the float, provides a good reflection surface that increases the radar signal strength.

The invention also relates to a method and device for measuring and/or monitoring the slurry level in a LTFT reactor.

The method of measuring and/or monitoring the slurry level may include the steps of:

transmitting an electromagnetic signal down a still well towards a reflective surface provided on a float in the still well; and receiving an electromagnetic signal reflected from the surface.

The device for measuring and/or monitoring the slurry level may include:

a radar signal transceiver;

a still well; and a float of lower density than the slurry provided with a reflective surface facing towards the transceiver.

The float may be manufactured of titanium and the reflective surface may be selected to be of a high dielectric constant to provide a strong reflected surface.

The reflective surface may be in the form of a flat disc attached to an operatively upper side of the float and the float may include a second flat disc opposite to the reflective disc on the under side of the float, to keep the float stable and in the correct orientation in the still well.

The invention also extends to a system for measuring and/or monitoring the slurry level in a LTFT reactor, which system includes:

a means for stilling a part of the surface of a slurry in a LTFT reactor;

a radar signal transceiver; and a float of lower density than the slurry provided with a reflective surface facing towards the transceiver.

SPECIFIC DESCRIPTION OF THE INVENTION

The invention is now described in more detail by way of non limiting examples.

Temperature Measurement:

With reference to schematic FIG. 1, in one embodiment of the invention, thermocouples 12 are installed and fitted along the internals of a LTFT reactor 10 through nozzle flanges (not shown) into the reactor and attached to the internal filter 14 by means of stainless steel clamps. The fittings are sealed by means of compression type fittings and a metal type seal for each nozzle flange. The thermocouples are of type K with outer sheath material in Alloy 800.

Thermocouple dimensions are typically 6000 mm long with a 3 mm diameter. The temperature transmitters are typically calibrated 0 to 800° C. The measurements are connected to the control system of the reactor for display and data is stored in a long-term database.

Damage to the filters can be expected at above 400° C. under typical LIFT conditions.

Slurry Level Monitoring

Figure 2:
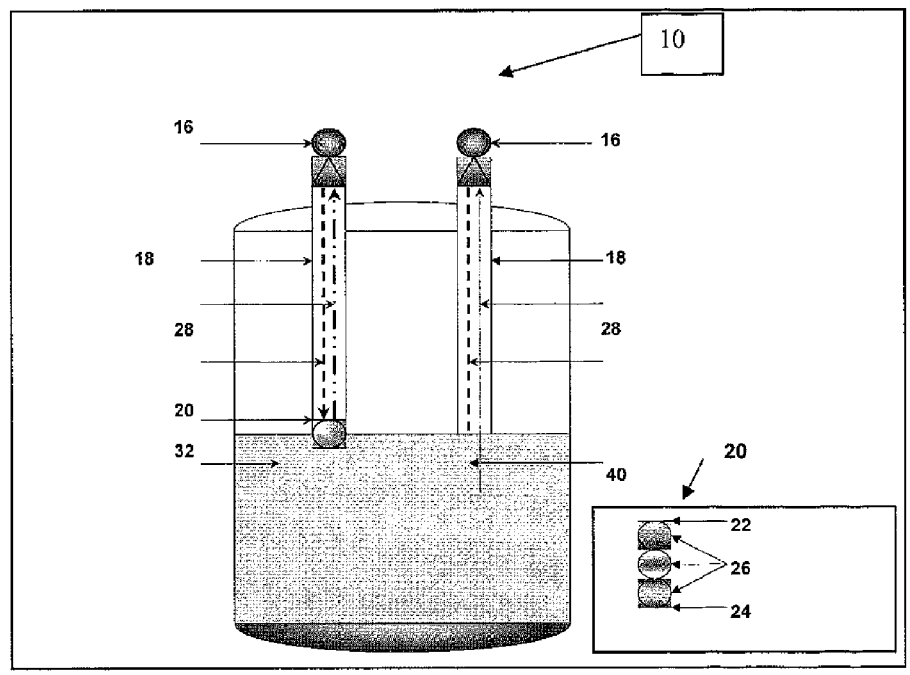

In one embodiment, shown schematically in FIG. 2, a radar transmitter 16 is installed at the top of the reactor measuring down a stilling well 18. A low-density float 20, made from lightweight titanium metal material, is installed in the stilling well. Flat disks 22 and 24 are installed on the top and bottom of the float. The float 20 comprises three spheres 26 welded together in a line perpendicular to the disks. It will be appreciated that the purpose of the top disk 22 is to provide a reflective surface with a high dielectric constant. The purpose of the bottom disk 24 is to stabilise the float position in the stilling well. The density of the float is less than 300 kg/m$^3$.

Due to its low density, the float 20 always floats on top of the product even when the density changes. The flat disk 22, installed on the top of the float, provides a good reflection surface that increases the radar signal 28 strength.

The stilling well 18 is a pipe with smooth inner wall. The well can be manufactured with holes or slots along the length of the well. The radar transmitter specification determines the size, shape and position of such holes.

The stilling well is installed in a vertical position from the top dome of the reactor 10, where the transmitter is installed, down to a position below the filters.

The float is constructed from a number of spheres 26 welded together. The required float density determines the number spheres required. Lightweight titanium circular disks are welded onto the top and bottom spheres.

The invention eliminates the effects on the radar transmitter performance in case of large density changes and low dielectric constants of the product.

On the right hand side of the drawing a system for monitoring the slurry level without a float is shown wherein the radar signal 40 is absorbed and diffused in the slurry liquid 32.

Emergency Back-Flushing

Referring again to FIG. 1, the slurry level 30 in the reactor 10 is measured with a radar signal transceiver. During normal operation the slurry is at a normal level 30 and the filters 14 are submerged in the catalyst slurry 32.

During low-level conditions in the reactor, when the slurry drops below a certain level 34, the emergency filter back-flush sequence is activated. The activation point for the emergency filter back flushing is at a level where the filters 14 are still submerged in the catalyst slurry. The pressure differential for the back-flush fluid relative to the reactor pressure is between 100 and 1000 kPa.

During the filter emergency back-flush sequence the normal back-flush sequence is interrupted. The filter banks are then back-flushed in sequence with oil or LTFT wax liquid for a short period, by opening a valve 36, followed by a continuous gas back flush by opening a valve 38. The back-flush gas is selected from nitrogen or LTFT reactor tailgas. The back-flush sequence lasts for 2 to 30 sec for liquid and 1 sec to continuous until the operator manually stops emergency back-flush.

In order to raise the slurry level, the syngas flow through the reactor is increased and/or the wax filtration is reduced.

The invention claimed is:

1. A method for the protection of an internal filter of a low temperature Fischer-Tropsch slurry bubble reactor, comprising:

detecting, in a low temperature Fischer-Tropsch slurry bubble reactor, a slurry level dropping below a preselected level by monitoring the slurry level in the low temperature Fischer-Tropsch slurry bubble reactor; and, in response, activating an emergency back-flush procedure, whereby an internal filter of the low temperature Fischer-Tropsch slurry bubble reactor is protected from damage caused by localized increased heat incursions.

2. The method of claim 1, wherein detecting further comprises detecting a temperature of at least one internal filter increasing above a preselected value by monitoring a temperature of at least one internal filter.

3. The method of claim 2, wherein the internal filter is hollow, and wherein the temperature is monitored by at least one thermocouple arranged inside the hollow internal filter.

4. The method of claim 2, wherein detecting comprises monitoring and recording a temperature along the internal filter.

5. The method of claim 2, wherein the preselected value is 400° C.

6. The method of claim 1, further comprising exposing the inner filter to a synthesis gas atmosphere in a head of the low temperature Fischer-Tropsch slurry bubble reactor, wherein exposing is conducted after activating the emergency back flush procedure.

7. The method of claim 1, wherein activating the emergency back flush procedure comprises subjecting the internal filter to a short burst of from 1 to 10 seconds of liquid back flush followed by a gas back-flush.

8. The method of claim 1, wherein the slurry level is monitored by at least one sensor selected from the group consisting of an electromagnetic wave signal sensor, a differential pressure sensor, and a nuclear sensor.

9. The method of claim 8, wherein detecting comprises monitoring the slurry level by measuring a distance down a stilling well by a radar transmitter installed at a top of the low temperature Fischer-Tropsch slurry bubble reactor.

10. The method of claim 1, wherein the slurry level is monitored by a radar transmitter installed at a top of the low temperature Fischer-Tropsch slurry bubble reactor measuring a distance down a stilling well.

11. The method of claim 10, wherein the distance measured is relative to a low-density float floating on the slurry in the stilling well.

12. The method of claim 1, wherein the preselected level is such that exposure of the filters and filter cake to a synthesis gas atmosphere is prevented.

13. The method of claim 1, wherein the emergency back-flush procedure is triggered before the at least one internal filter is exposed to a synthesis gas atmosphere in a head of the low temperature Fischer-Tropsch slurry bubble reactor.

* * * * *